United States Patent [19]
Nishikawa et al.

[11] Patent Number: 5,650,611
[45] Date of Patent: Jul. 22, 1997

[54] LIGHT SWITCHING METHOD, LIGHT SWITCHING APPARATUS AND OPTICAL SEMICONDUCTOR DEVICE

[75] Inventors: Yuji Nishikawa; Atsushi Takeuchi; Shunichi Muto, all of Kawasaki, Japan

[73] Assignee: Fujitsu Limited, Kawasaki, Japan

[21] Appl. No.: 514,623

[22] Filed: Aug. 14, 1995

[30] Foreign Application Priority Data

Sep. 7, 1994 [JP] Japan ................................. 6-213899
Sep. 9, 1994 [JP] Japan ................................. 6-215773

[51] Int. Cl.$^6$ ................................. G02F 1/01
[52] U.S. Cl. ................................. 250/225; 250/214 LS; 257/22
[58] Field of Search ................................. 250/225, 214 LS, 250/214.1; 385/16–18, 122; 257/15–17, 21, 22, 25; 359/108, 107

[56] References Cited

U.S. PATENT DOCUMENTS 5,005,933  4/1991  Shimuzu ................................. 257/17
5,151,589  9/1992  Takeuchi ................................. 250/225

OTHER PUBLICATIONS

"Highly Repetitive Picosecond Polarization Switching in Type-II AlGaAs/AlAs Multiple Quantum Well Structures", Kawazoe et al, *Jpn. J. Appl. Phys.* vol. 32, pp. L1756–L1759, Oct. 1993.

*Primary Examiner*—Que Le
*Attorney, Agent, or Firm*—Nikaido, Marmelstein, Murray & Oram LLP

[57] ABSTRACT

A light switching apparatus includes an optically non-linear etalon, a first optical part for applying a signal light of a linear polarization to the optically non-linear etalon, and a second optical part for applying a control light of a circular polarization or elliptical polarization to the optically non-linear etalon. The control light varies a refractive index of an optically non-linear substance of the optically non-linear etalon to thereby perform a switching operation on the signal light.

29 Claims, 15 Drawing Sheets

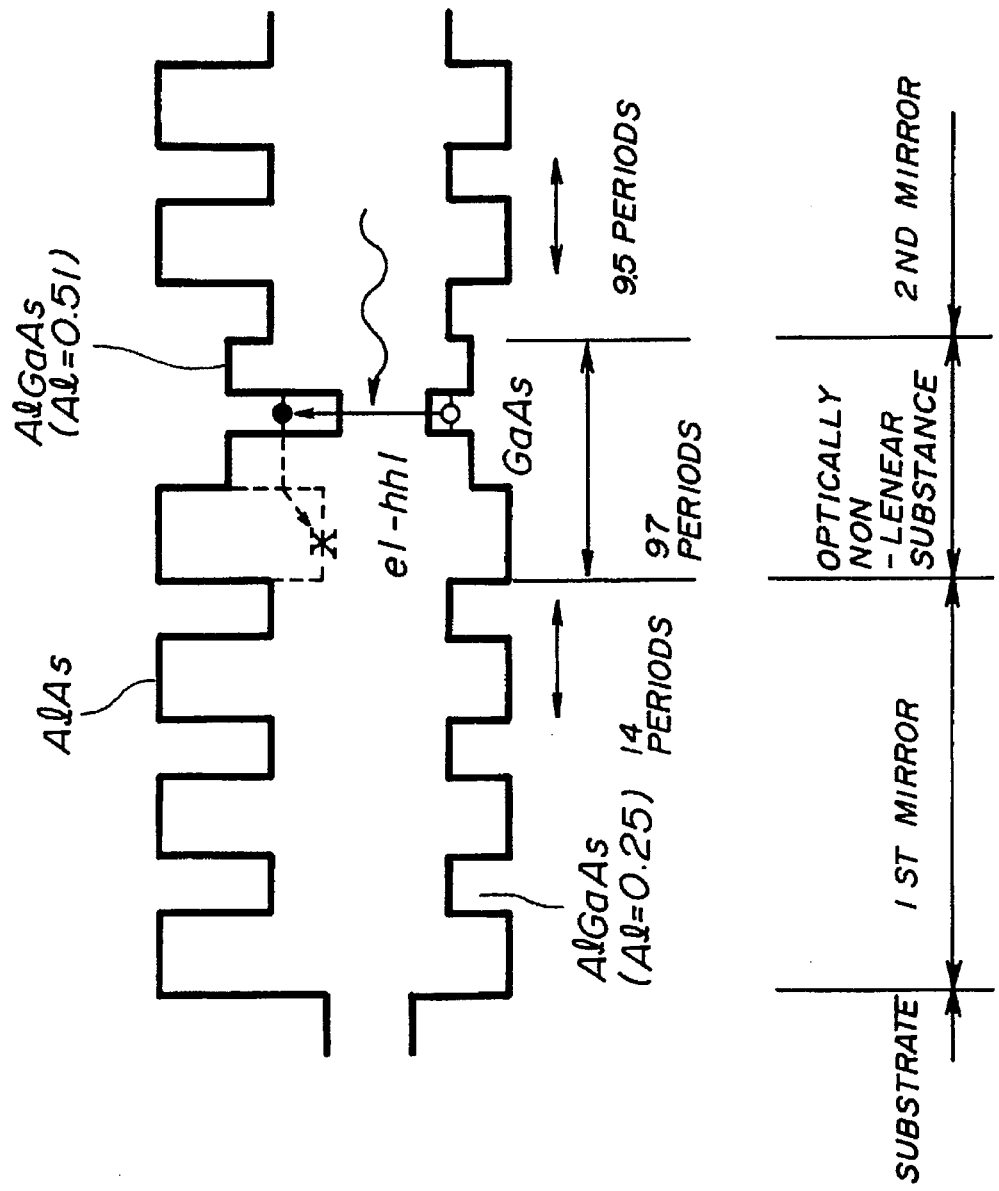

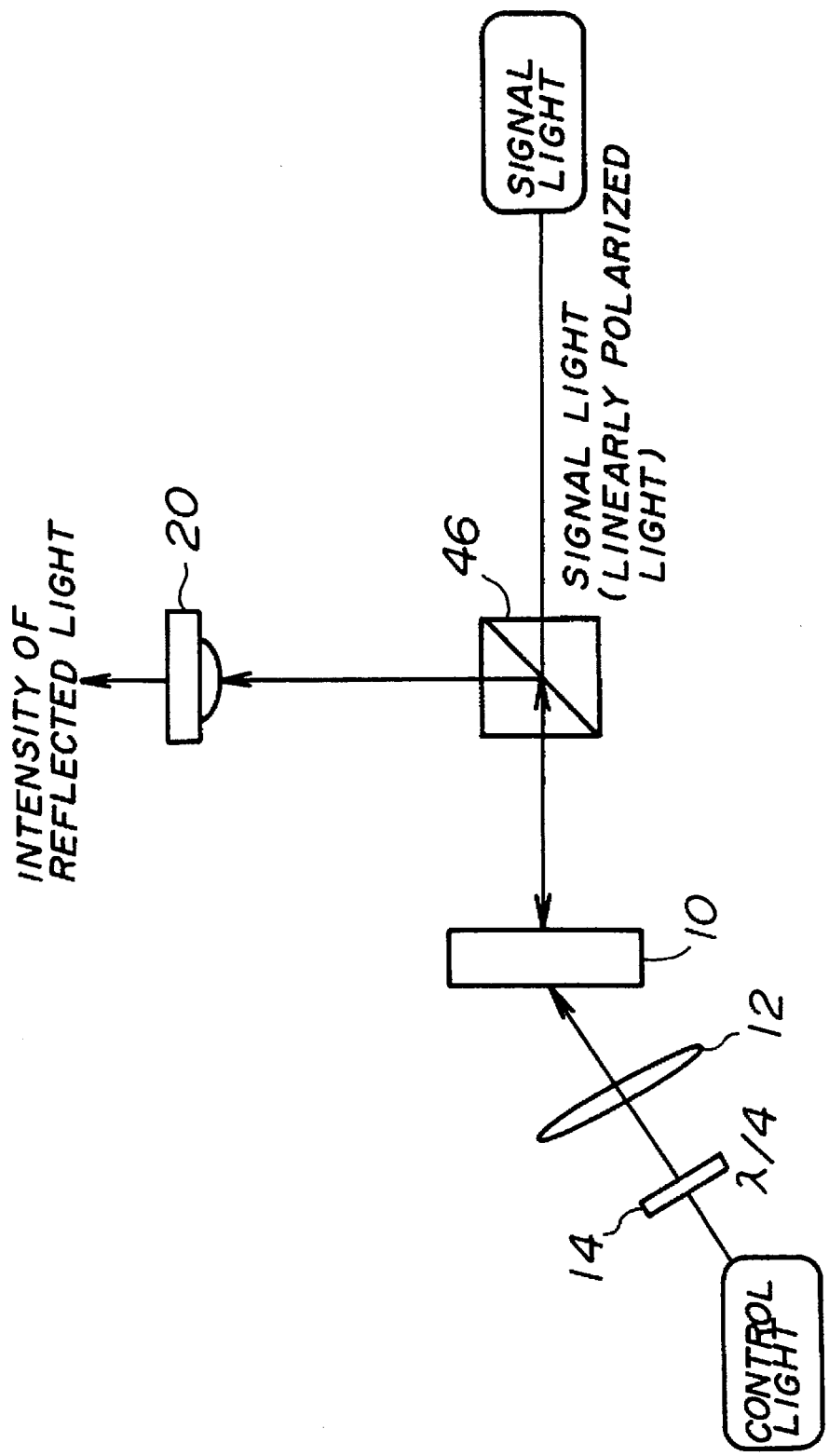

LIGHT SWITCHING METHOD, LIGHT SWITCHING APPARATUS AND OPTICAL SEMICONDUCTOR DEVICE

BACKGROUND OF THE INVENTION

1. Field of the Invention

The present invention generally relates to an optical semiconductor device having an optical non-linearity, a light switching apparatus using such an optical semiconductor device, and a light switching method.

Recently, there has been considerable activity in the research and development of optical semiconductor devices having an optical non-linearity in order to realize light-light switches, optically bistable devices, light-light memories and so on. Such an optical semiconductor device has a nature resulting from the optical non-linearity in which excitons and free electron/hole pairs are excited and the light absorbing coefficient and refractive index are thus varied. However, the currently proposed optical semiconductor devices have problems to be solved.

2. Description of the Prior Art

FIG. 1 shows a light-light switching apparatus and a light switching method utilizing an optical non-linearity dependent on spins. The apparatus and method shown in FIG. 1 is disclosed in T. Kawazoe et al., "HIGHLY REPETITIVE PICOSECOND POLARIZATION SWITCHING IN TYPE-II AlGaAs/AlAs MULTIPLE QUANTUM WELL STRUCTURES", Jpn. J. Appl. Phys. Vol. 32, 1993, pp. L1756. A linearly polarized light 26 is split into two light components by means of a beam splitter (BS) 28. One of the two light components is a control light 30, and the other light component is a signal light 32. A quarter wave plate 34 is provided on the optical axis of the control light 30 from the beam splitter 28. The quarter wave plate 34 converts the incident light into a right circularly polarized light. That is, the control light passing through the quarter wave plate 34 is a light-handed circularly polarized light. This light enters a mirror pair (MP) 36, which forms a light train of 80 GHz. The light train from the mirror pair 36 is converged by a lens (L) 38, and is projected onto an optical semiconductor device (S) 40 including an optically non-linear element.

The signal light 32 outgoing from the beam splitter 28 passes through the lens 38 while the linear polarization is maintained, and is then projected onto the optical semiconductor device 40. In order to facilitate the better understanding of the following description, it will now be assumed that the signal light 32 is a longitudinally polarized light (S-polarized light).

The longitudinally polarized light can be divided into a right circularly polarized light component and a left circularly polarized light component. When the signal light 32 is projected onto the optical semiconductor device 40 in a state in which the control light 30 having the right circular polarization, the absorption coefficient for the right circularly polarized light component is reduced due to the influence of the control light 30, while the left circularly polarized light component is not influenced. In this way, light switching is implemented.

The signal light 32 passes through the quarter wave plate 42, which converts the right circularly polarized light component into a transversely polarized light (P-polarized light) and converts the left circularly polarized light component into a longitudinally polarized light. A Wollaston prism (WP) 44 separates the transversely polarized light and the longitudinally polarized light from each other. These separated lights are respectively detected by photodiodes (PD) 46. Then, the difference between the outputs of the photodiodes 46 is produced, so that light switching can be observed. The spins are relaxed with a few picoseconds to tens of picoseconds, so that the up spins and down spins are balanced. As a result, the difference between the signals becomes zero after spin relaxation.

As described above, the signals are recovered at an extremely high speed, so that an optical semiconductor device capable of performing high-speed repetitive operation can be realized.

However, optical semiconductor devices as described above have the following disadvantage. The switching operation utilizes a variation in light absorption caused by projecting of the control light. Hence, the intensity of output signals from the photodetectors is very weak.

There is another disadvantage. A logical operation is impossible in which a plurality of control lights are given to the optical semiconductor device. In other words, the switching operation cannot obtained unless both the control light and the signal light are incident to the optical semiconductor device. That is, only the AND operation can be performed.

Further, the optical switching apparatus shown in FIG. 1 needs processing of electric signals output by the photodiodes 46, and is not a truly optical apparatus.

SUMMARY OF THE INVENTION

It is an object of the present invention to provide a light switching method capable of producing large output signals by utilizing variations in the refractive index and performing various logical operations.

Another object of the present invention is to provide a light switching apparatus and an optical semiconductor device for accomplishing the above light switching method.

The above objects of the present invention is achieved by a light switching method comprising the steps of: applying a signal light of a linear polarization to an optically non-linear etalon; and applying a control light of a circular polarization or elliptical polarization to the optically non-linear etalon. The control light varies a refractive index of the optically non-linear etalon to thereby perform a switching operation on the signal light.

It is possible to form a fully optical apparatus by providing the above method with a step of extracting linearly polarized light components of the signal light after the signal light passes through or is reflected by the optically non-linear etalon, the linearly polarized light components being perpendicular to the signal light before the signal light is applied to the optically non-linear etalon.

The above objects of the present invention are also achieved by a light switching apparatus comprising: an optically non-linear etalon; first optical means for applying a signal light of a linear polarization to the optically non-linear etalon; and second optical means for applying a control light of a circular polarization or elliptical polarization to the optically non-linear etalon. The control light varies a refractive index of an optically non-linear substance of the optically non-linear etalon to thereby perform a switching operation on the signal light.

It is also possible to provide a fully optical system by additionally providing means for, after the signal light passes through or is reflected by the optically non-linear etalon, making the signal light pass through a polarizer position in a direction perpendicular to the signal light before the signal light is applied to the optically non-linear etalon.

The above-mentioned objects of the present invention are also achieved by an optical semiconductor device comprising: an optically non-linear substance; a first mirror provided on a first surface of the optically non-linear substance; and a second mirror provided on a second surface of the optically non-linear substance. A signal light of a linear polarization is applied to the optically non-linear etalon. A control light of a circular polarization or elliptical polarization is applied to the optically non-linear etalon. The control light varies a refractive index of the optically non-linear substance to thereby perform a switching operation on the signal light.

BRIEF DESCRIPTION OF THE DRAWINGS

Other objects, features and advantages of the present invention will become more apparent from the following detailed description when read in conjunction with the accompanying drawings, in which:

FIG. 6 is a diagram of a structure of the optical semiconductor device according to the first embodiment of the present invention;

FIG. 16 is a variation of the structure shown in FIG. 15.

DESCRIPTION OF THE PREFERRED EMBODIMENTS

A description will now be given, with reference to FIG. 2, of a light switching apparatus according to a first embodiment of the present invention.

Figure 1:
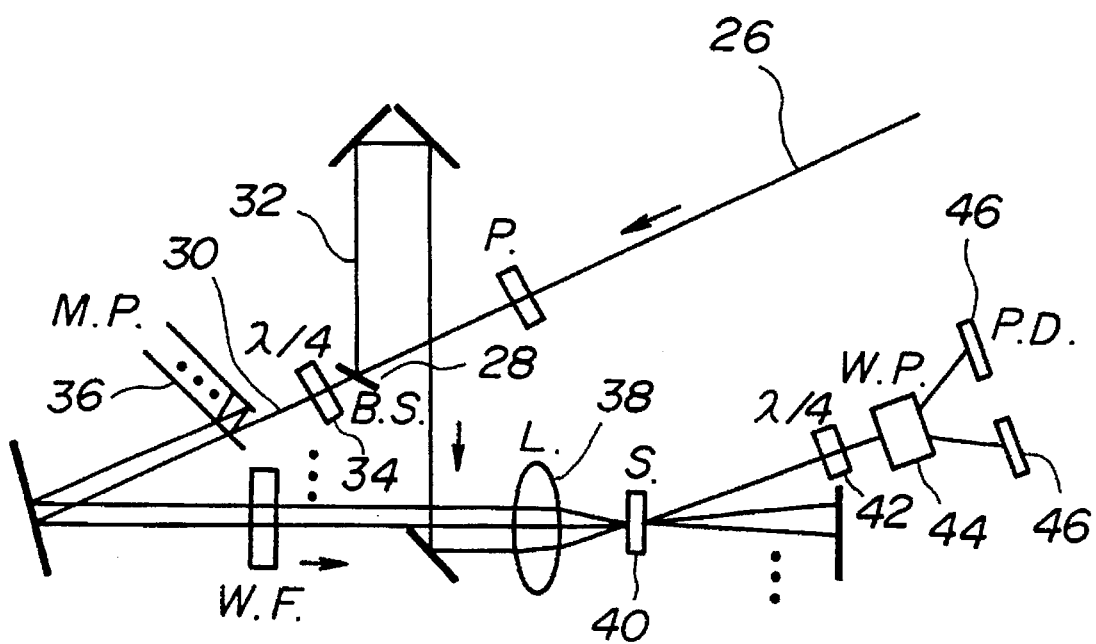
FIG. 1 is a diagram of a conventional light switching apparatus.
Figure 2:
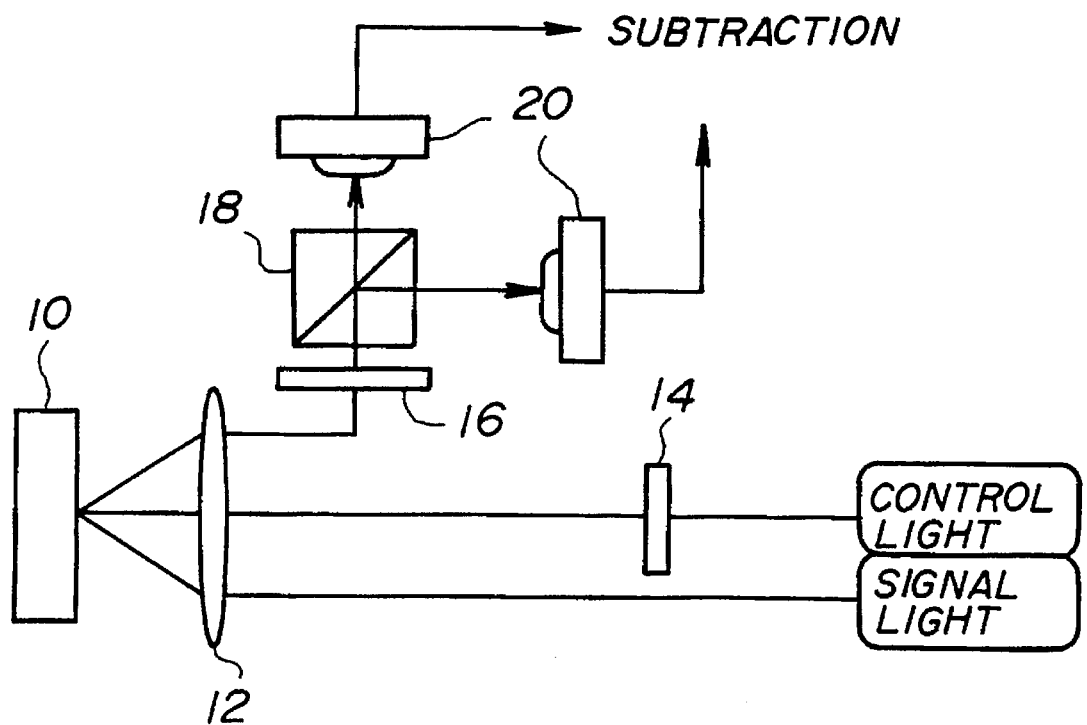
FIG. 2 is a diagram of a first embodiment of the present invention.

Referring to FIG. 2, a linearly polarized signal light and a control light are incident to an optical semiconductor device 10 via a lens 12. The control light is converted into a circularly polarized light through a quarter wave plate 14. The optical semiconductor device 10 forms an optically non-linear etalon in which an optically non-linear substance is sandwiched between two mirrors. The light incident to the optical semiconductor device 10 enters the lens 12 again, and is converted into an elliptically polarized light through a quarter wave plate 16. Then, the light outgoing from the quarter wave plate 16 enters a polarization beam splitter (PBS) 18, which separates the incident light into a longitudinally polarized light and a transversely polarized light. Two photodiodes 20 detect the respective separated polarized lights.

The first embodiment of the present invention has a feature in which the optical semiconductor device 10 includes an optically non-linear etalon, and utilizes refractive index dependent on spins, associated with light absorption.

Figure 3A:
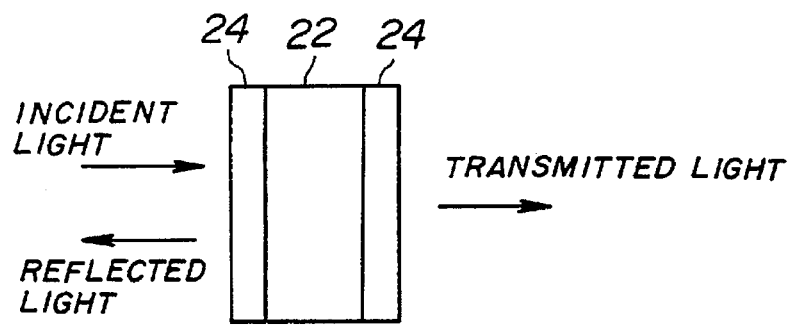
FIGS. 3A, 3B and 3C are diagrams showing the principle of an optical semiconductor device according to the first embodiment of the present invention.
Figure 3B:
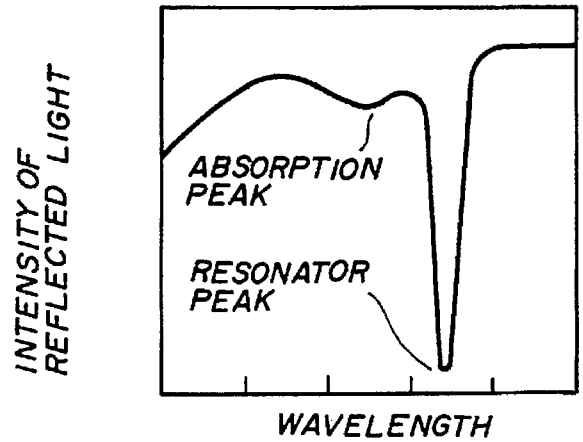
Figure 3C:
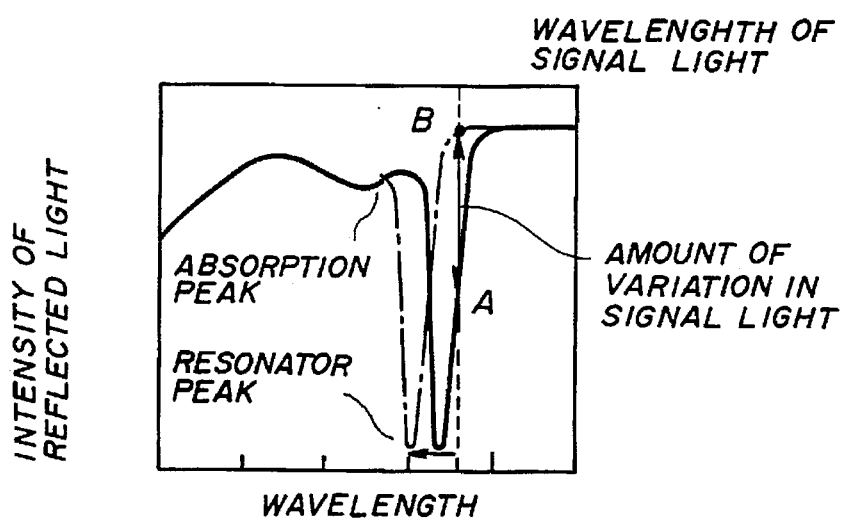

A description will now be given, with reference to FIGS. 3A, 3B and 3C, of the principle of the optically non-linear etalon forming the optical semiconductor device 10. As shown in FIG. 3A, the optically non-linear etalon has a structure in which an optically non-linear substance 22 is sandwiched between two mirrors 24. When light is applied to the optically non-linear etalon, there appear not only an absorption peak resulting from the optically non-linear substance 22 but also a resonator peak caused by a pair of mirrors, as shown in FIG. 3B. Regarding design of the optically non-linear etalon, it is desirable that the resonator peak appears at a wavelength which is 5–10 nm longer than that of the absorption peak.

When the control light is projected onto the non-linearly etalon, the carriers are excited in the optically non-linear substance 22 and result in a variation in the refractive index thereof. The wavelength of the resonator peak is expressed by the product of the interval between the mirrors 24 and the refractive index of the optically non-linear substance 22. Hence, the substantial resonator length is varied. Hence, as indicated by the one-dot chained line in FIG. 3C, the resonator peak shifts. At this time, if the wavelength of the signal light is set equal to that indicated by the broken line in FIG. 3C, the light intensity of the reflected light of the signal light is changed from A to B. The amount of this variation is greater than the amount of variation due to light absorption. It can be seen from FIGS. 3B and 3C that a change of the absorption peak is very small. Taking into account the above, the control light is set to a wavelength at which the absorption peak can be excited, and the signal light is set to a wavelength around the resonator peak.

A description will now be given of the operation of the optically non-linear etalon dependent on spins.

Generally, linearly polarized lights are used as the control light and the signal lights. If the linearly polarized lights are converted into the circularly polarized light through a quarter wave plate, only up spin electrons are excited for the right circularly polarized light, while only down spin electrons are excited for the left circularly polarized light. At this time, the spin electrons can be influenced by the respective control lights and the absorption rate and the refractive index are varied. For example, when the right circularly polarized control light is used, only the signal light of the right circular polarization is influenced by the control light so that the reflected light and transparent light are varied. The spins are relaxed within tens of picoseconds, and the up spins and down spins are balanced.

Figure 4:
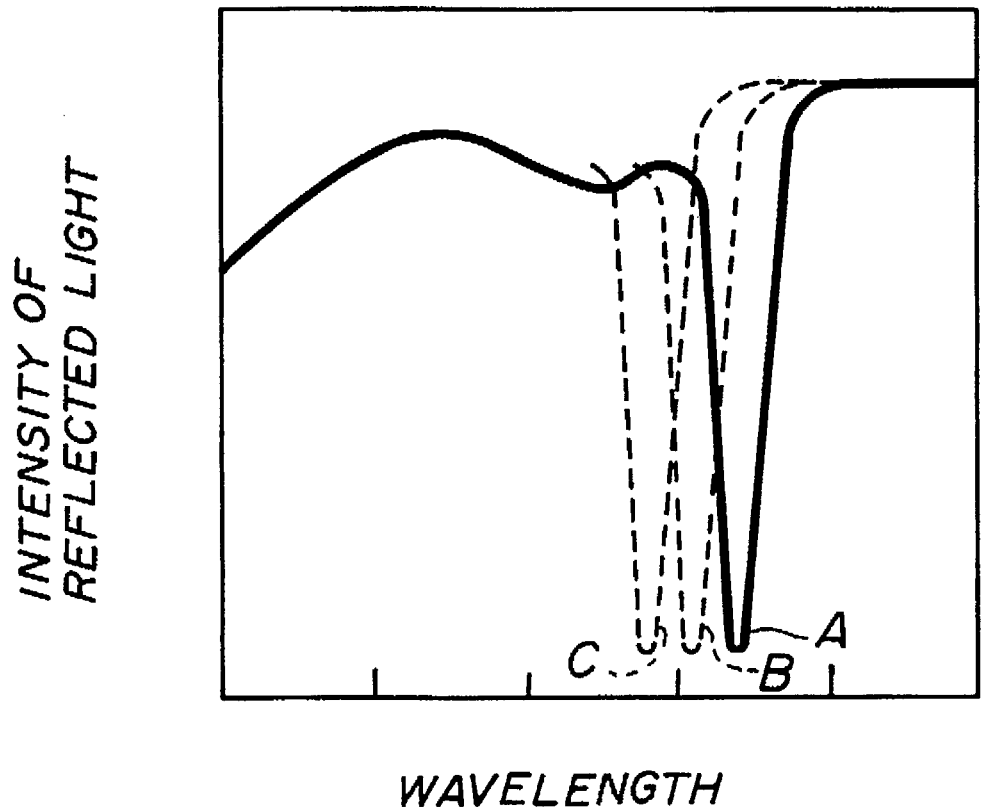
FIG. 4 is a graph showing a variation in the intensity of a reflected light as a function of a variation in the refractive index of an optically non-linear substance.

FIG. 4 is a graph showing a process in which the resonator peak is moved. When the control light and signal light are right circularly polarized lights, the resonator peaks shift from A to C. Then, the resonator peak returns to position B due to spin relaxation after tens of picoseconds. Alternatively, when the control light and signal light are right and light-handed circularly polarized lights, respectively, the resonator peak retains at position A immediately after excitation, and then shifts to position B due to spin relaxation. Hence, the difference between the signal light of the right circularly polarized light reflected by or passing through the optically non-linear etalon and the signal light of the left circular polarization is zero because the resonator peak is located in the same position before excitation and after spin relaxation. Hence, the signal difference has magnitudes immediately after excitation and before spin relaxation.

Hence, it is possible to obtain a response which can be completely recovered within the spin relaxation time by utilizing a right or left circularly polarized light as the control light and utilizing a linearly polarized light as the signal light. The following will be noted. The linear polarization consists of the right circular polarization and the left circular polarization. Hence, it is possible to observe the signal that is totally restorable within tens of picoseconds by converting two circularly polarized light components into the transversely and longitudinally polarized lights through a quarter wave plate after the signal light is varied by the optically non-linear etalon and detecting the difference between the transversely polarized light and the longitudinally polarized light separated by the polarization beam splitter.

A GaAs bulk or a GaAs multiple quantum well can be used as an optically non-linear substance used for the optically non-linear etalon shown in FIG. 3A. The GaAs multiple quantum well is more appropriate than the GaAs bulk because the former has a greater optical non-linearity.

It is to be noted that, when either one of the above two substances is used, only the recovery time due to the spin relaxation can be obtained. That is, there is no controllability of the recovery time.

With the above in mind, it is much desirable to use a type II TBQ (Tunneling Bi-Quantum well) etalon in which electrons moves to other layers by tunneling and the spins of holes are relaxed at very high speed. Hence, the recovery time can be controlled by changing the thickness of a barrier layer. Further, it is possible to speed up the operation by omitting the barrier layer, while the exciton effect is reduced and hence the optical nonlinearity is reduced.

Figure 5A:
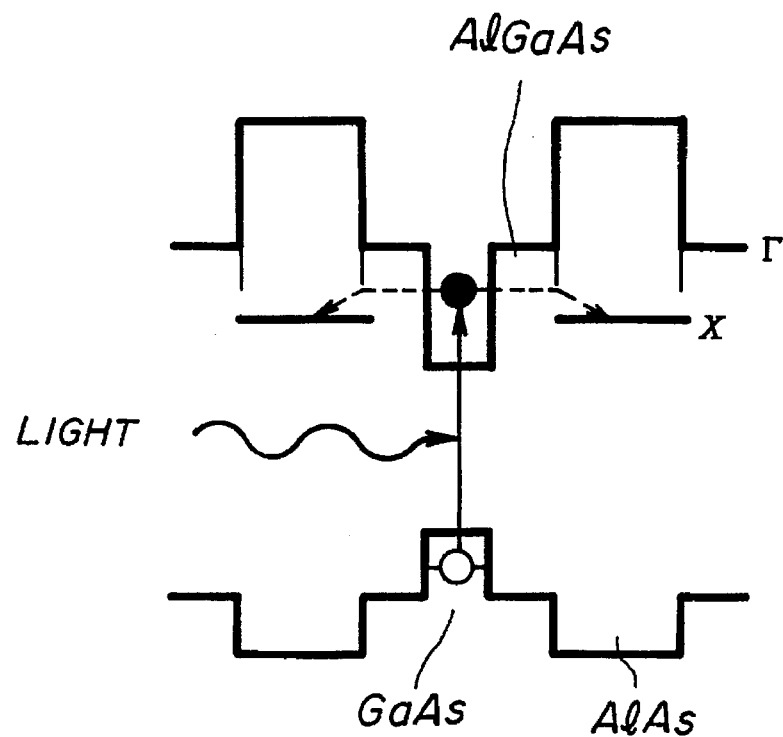
FIGS. 5A and 5B are diagrams of a type II TBQ structure and an operation thereof.

As shown in FIG. 5A, the type II TBQ etalon has a structure in which a GaAs quantum well is sandwiched between AlGaAs barrier layers, which are sandwiched between AlAs layers (indirect quantum wells). That is, the type II TBQ etalon has one period (unit structure) of AlAs/AlGaAs/GaAs/AlGaAs.

Figure 5B:
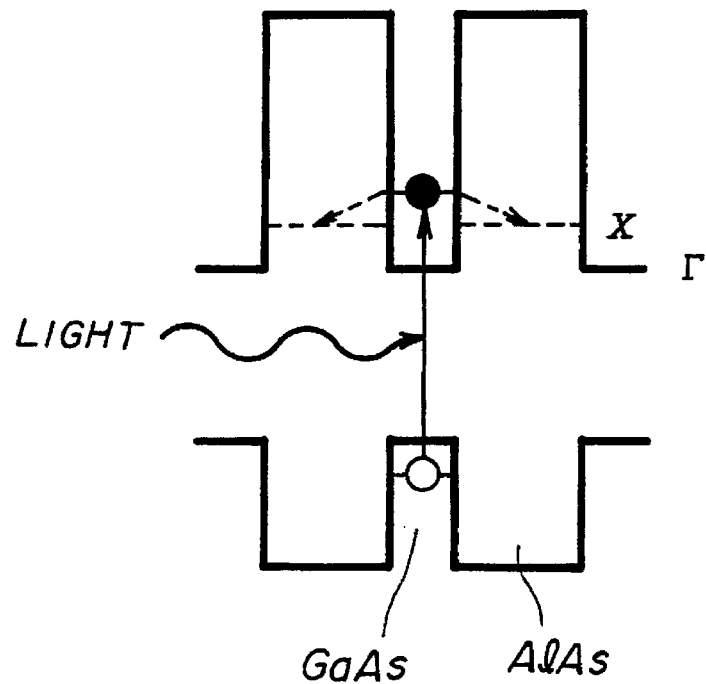

In design of the type II TBQ structure, the quantum level of electrons in the GaAs layer is higher than a quantum level at X-point of the AlAs layers (FIG. 5A). This can be achieved by adjusting the thicknesses of the layers. FIG. 5B is a band diagram of a type II TBQ structure having no barrier layers (AlGaAs layers). The design manner for the type II TBQ structure shown in FIG. 5B is the same as that for the type II TBQ structure shown in FIG. 5A.

When a light which excites the GaAs layer is projected to the etalon, electron-hole pairs are produced in the GaAs layer. These pairs influence the amount of transmission and reflection of the signal light. Generally, in the multiple quantum well, the recovery from the absorption is made due to the lifetime of the generated carriers. Hence, the response performance is approximately equal to 10 ns, which is the lifetime of the carriers. However, in the structure being considered, the level at the X-point in the AlAs layers is lower than the level in the GaAs layer in which the electrons are present. Hence, if the AlGaAs barrier layers are sufficiently thin to realize tunneling, the excited electrons move to the AlAs layers by tunneling. This movement takes place in the order of picoseconds, so that the intensity of the signal light can be recovered at an extremely high speed. Further, it is possible to control the tunneling time, that is, the time it takes the signal light to be recovered by controlling the thicknesses of the AlGaAs barriers. Particularly, a response performance less than one picosecond can be obtained in the structure shown in FIG. 5B in which the thicknesses of the barrier layers are zero.

There is a great advantage in which the control light and the signal light are not absorbed in any layers other than the GaAs layers. This is because great light absorption does not take place between Γ point in the valence band of GaAs and X point in the conduction band of AlAs, and the band gap of AlAs is greater than that of the GaAs quantum well. Hence, the type II TBQ structure can be used so that it is placed in a resonator like an etalon.

A further description will now be given of the light switching device and the light switching method according to the first embodiment of the present invention.

A dye laser is excited by the second harmonic of the YAG laser in order to obtain a light pulse of one picosecond. A right circularly polarized light is used as the control light, and has a selected wavelength which can excite heavy holes. In a case where the band gap transition consists of electron-light-hole pairs due to the strain effect, only the light holes are excited. This is because the up spins are excited when the heavy holes are excited by the right circularly polarized light, and the down spins are excited when the light holes are excited thereby. The wavelength of the signal light is set in a steep incline portion of a wavelength slightly shorter than the resonator peak of the optically non-linear etalon forming the optical semiconductor device 10. The signal light enters the optical semiconductor device 10 while the linear polarization is retained.

As shown in FIG. 6, the optical semiconductor device 10 has a first mirror formed on a GaAs (001) substrate. The first mirror has 14 periods of stacked layers. One period of the stacked layer includes $Al_{0.25}Ga_{0.75}As/AlAs$ (54.4 nm/64.2 nm). On the first mirror, there is provided an optically non-linear substance having a type II TBQ structure, which includes 97 periods of stacked layers. One period of the stacked layers includes $GaAs/Al_{0.51}Ga_{0.49}As/AlAs/Al_{0.51}Ga_{0.49}As$ (2.8 nm/1.7 nm/7.1 nm/1.7 nm). A second mirror is provided on the above optically non-linear substance. The second mirror has 9.5 periods of stacked layers. One period of the stacked layers includes $Al_{0.25}Ga_{0.75}As/AlAs$ (54.4 nm/64.2 nm).

The first mirror, the type II TBQ structure and the second mirror can be formed in this order on the GaAs substrate by, for example, a molecular beam epitaxy method.

A description will now be given, with reference to FIG. 2, of the operation of the light switching apparatus according to the first embodiment of the present invention.

A linearly polarized light is separated into two components by means of a beam splitter (not shown for the sake of simplicity). One of the two light components is a control light, and the other is a signal light. The control light is reflected by a mirror (not shown for the sake of simplicity)

used to adjust the difference between the optical path lengths of the signal light and control light. Then, the reflected control light is converted into a right circularly polarized light by the quarter wave plate 14, and is then projected onto the optical semiconductor device 10.

The signal light is projected onto the optical semiconductor device 10 while the linear polarization thereof is maintained. The signal light is reflected by the optical semiconductor device 10. The reflected signal light, which is influenced by the control light, passes through the quarter wave plate 16, which converts the circularly polarized components into linearly polarized light components. These components are separated from each other by the polarization beam splitter 18, from which splitter a longitudinally polarized light and a transversely polarized light outgo for detection. In the experiment directed to measuring of some characteristics which will be described later, the time was changed by means of a pump probe method, which was used as an auxiliary means for moving the mirror to change the difference in the optical path length between the control light and the signal light. In this way, the difference between the two polarized light components was obtained as a signal.

Figure 7:
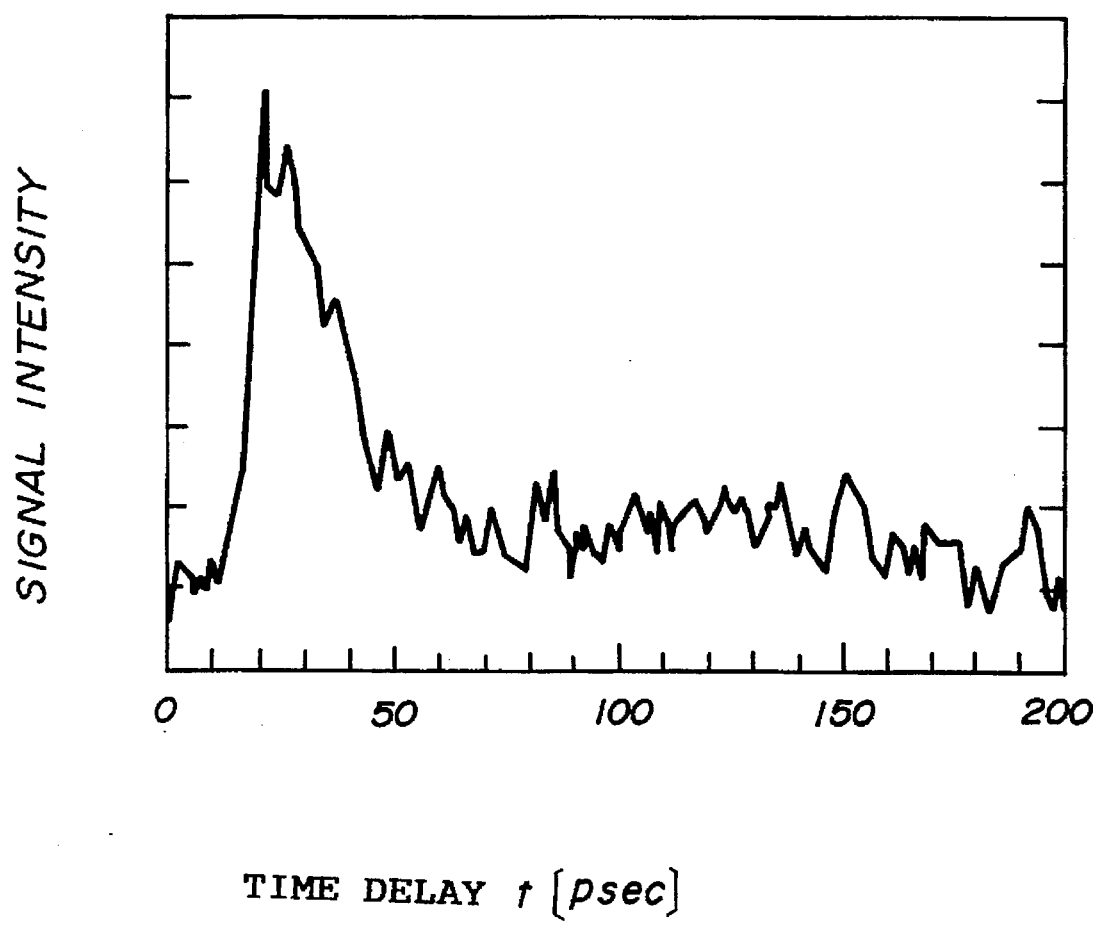
FIG. 7 is a graph of an output signal of a light switching apparatus according to the first embodiment of the present invention.

FIG. 7 shows a signal obtained by the above structure. As shown in FIG. 7, a signal in which the turn-off operation is completed with approximately 50 picoseconds can be obtained.

A description will now be given of a method of performing logical operation by means of the above-mentioned optical semiconductor device.

Figure 8:
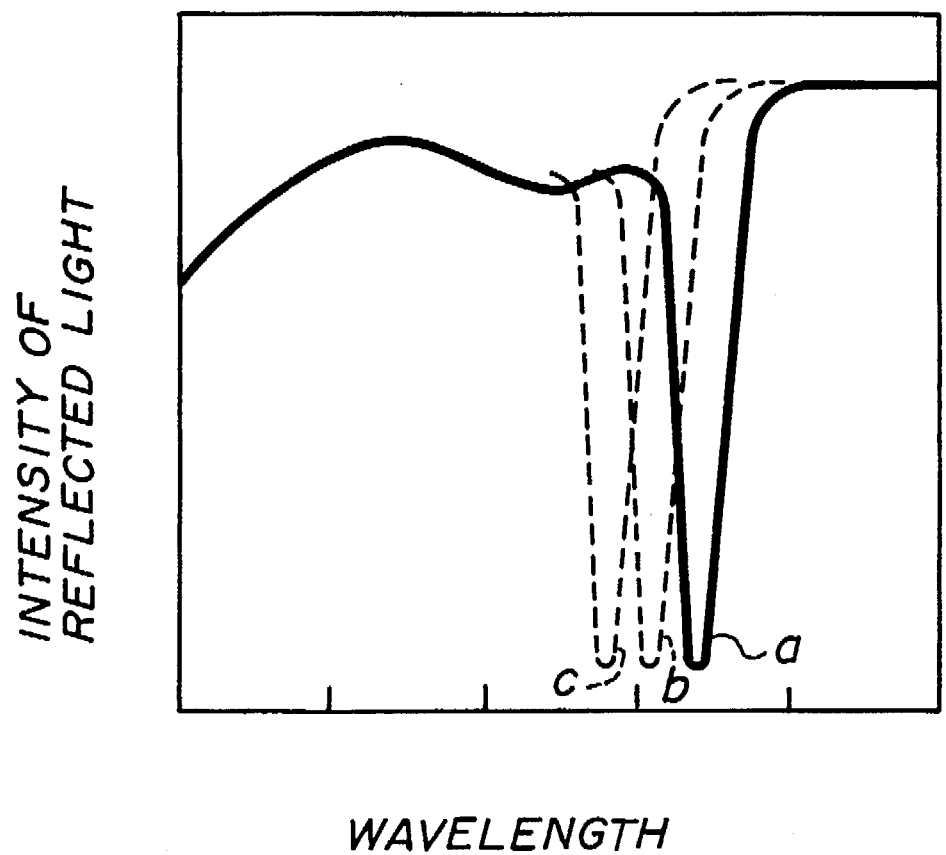
FIG. 8 is a graph showing a variation in the intensity of a reflected light dependent on applying of a control light.

FIG. 8 shows the intensity of the light reflected by the optical semiconductor device. FIG. 8 shows three light resonator peaks. A resonator peak a, which has the longest wavelength among the three peaks, indicates a light intensity obtained when no control light is incident to the optical semiconductor device. A resonator peak b indicates a light intensity obtained when one control light is applied to the device. A resonator peak c indicates a light intensity obtained when two control lights are applied to the device.

Figure 9A:
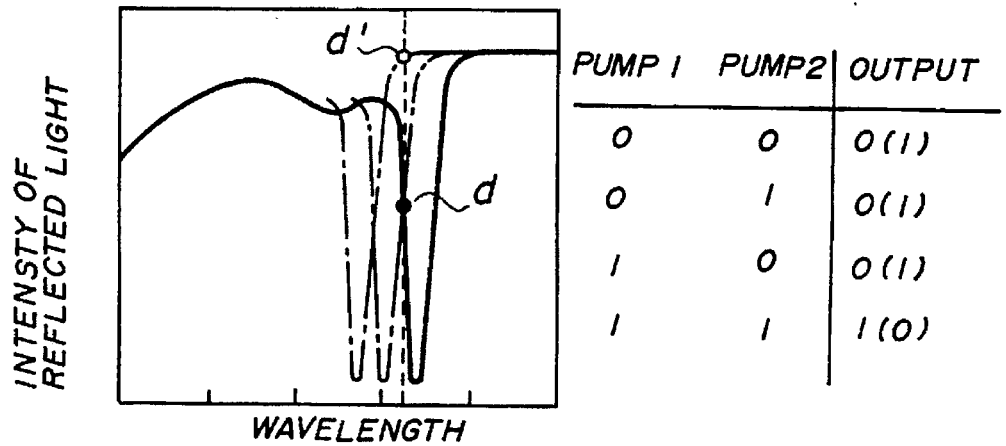
FIGS. 9A, 9B and 9C are diagrams of the principle of logical operations according to the first embodiment of the present invention.

Let us consider a case where the signal light is set at the crosspoint d of the resonator peaks a and b. It can be seen from FIG. 9A that the light intensity does not change from the crosspoint d when the no control light or one control light is applied to the device. When the two control lights are applied to the device, the light intensity is increased to d'. Hence, assuming the case where the intensity of the reflected light changes to be 1, the above corresponds to the AND logic operation.

Figure 9B:
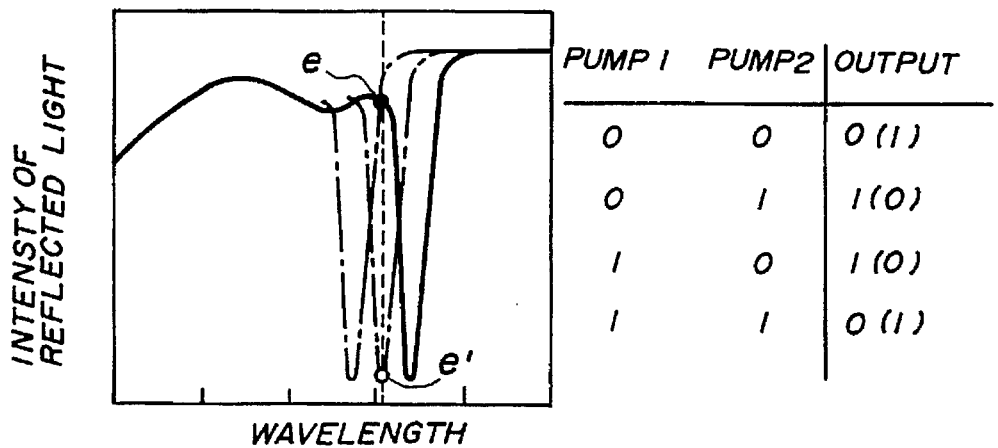

Let us consider a case where the signal light is set at the crosspoint e of the resonator peaks a and c. It can be seen from FIG. 9B that the light intensity is maintained at point e in the case where no control light or the two control lights are incident to the optical semiconductor device. When only one control light is applied to the device, the light intensity is decreased to e'. Hence, assuming the case where the intensity of the reflected light changes to be 1, the above corresponds to the exclusive-OR (EXOR) operation.

Figure 9C:
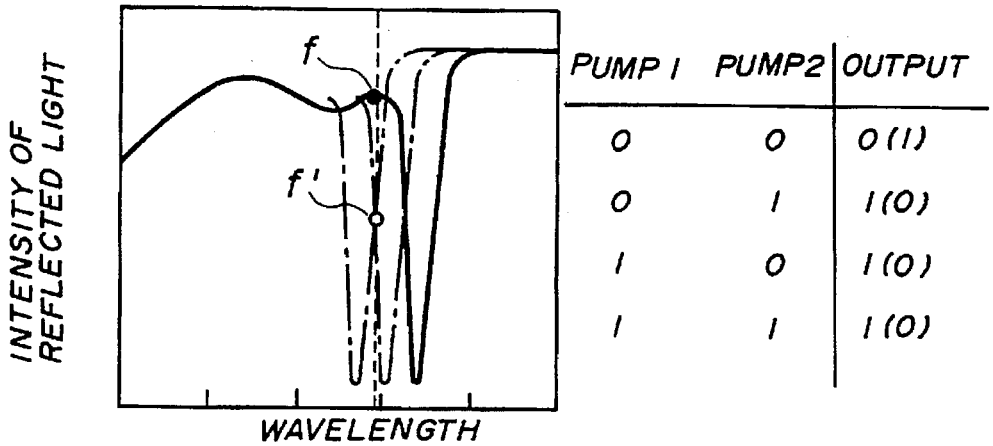

Let us consider a case where the signal light is set at the crosspoint f of the resonator peaks b and c. It can be seen from FIG. 9C that the light intensity does not change from the crosspoint f when no control light is incident to the optical semiconductor device. When one or both of the control lights are applied to the device, the light intensity is decreased to f'. Hence, assuming the case where the intensity of the reflected light changes to be 1, the above corresponds to the OR operation.

Since the setting of 0 and 1 can be interchanged, the NAND, EXNOR and NOR operation can be accomplished.

Similarly, a logic operation utilizing spins can be realized. When the spins are excited by the right circularly polarized light, the signal component of the left circularly polarized light is positioned at the original peak position immediately after excitation. Hence, the setting of 0 and 1 can be made depending on whether the intensity of the reflected light of the left circular polarization differs from that of the reflected light of the right circular polarization.

According to the first embodiment of the present invention, the optical semiconductor device is formed by the optically non-linear etalon, so that the signal intensity greater than that obtained in the conventional switching based on variations in absorption can be produced. In addition, it is possible to perform various logical operations other than the AND operation.

The optical semiconductor device utilizing the type II TBQ structure as the optically non-linear substance makes it possible to control the recovery time of the signal light by means of the thickness of the barrier layers and to easily speed up the operation.

Various variations of the first embodiment of the present invention can be made. For example, the first embodiment of the present invention uses the circularly polarized light as the control light. Alternatively, an elliptically polarized light can be used. Instead of processing the reflected light, a light passing through the optical semiconductor device can be used. This case needs a modified optical semiconductor device so that the GaAs substrate is omitted from the structure shown in FIG. 6 by etching.

A description will now be given of a second embodiment of the present invention, which is intended to expanding the structure of the first embodiment thereof so that the system is fully optically configured.

The principle of the second embodiment of the present invention will first be described with reference to FIGS. 10A, 10B and 10C, although the following description may partially overlap with the previous description.

Figure 10A:
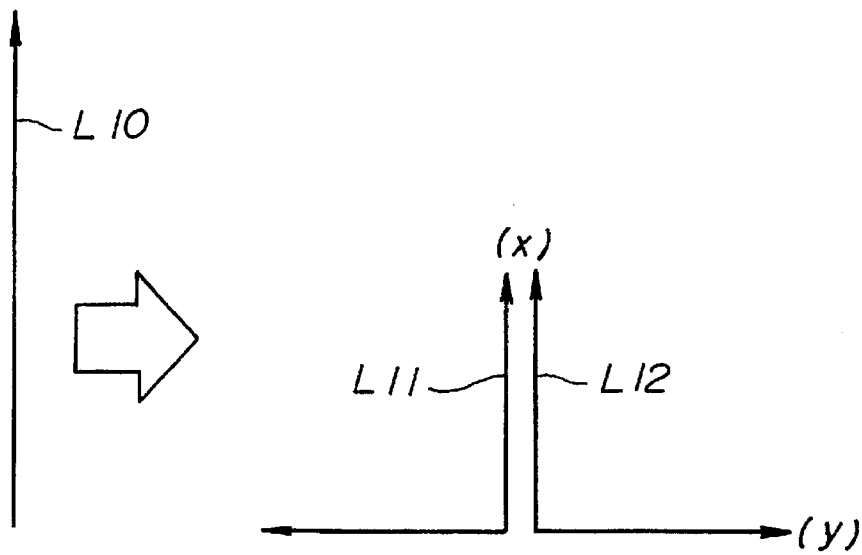
FIGS. 10A, 10B and 10C are diagrams showing the principle of a second embodiment of the present invention.

FIG. 10A shows a linearly polarized light L10 (more particularly, a longitudinally polarized light in FIG. 10A). The linearly polarized light L10 can be separated into a left circularly polarized light component L11 and a right circularly polarized light component L12, these components having an identical light intensity (magnitude). FIG. 10A shows the above two circularly polarized light components so that each of the light components is represented by two mutually orthogonal components. In the direction in which the electric field components of lights (also referred to as an x-axis direction) coincide with each other, the sum of the light components L11 and L12 having an identical intensity forms the linearly polarized light L10. In the direction (also referred to as a y-axis direction) perpendicular to the direction in which the electric field components coincide with each other, the components L11 and L12 have the same intensity, but are oriented in the opposite directions.

Let us consider a case where the linearly polarized light L10 is projected onto the optically non-linear element and an exciting light (control light) L13 of circular polarization is also projected thereon. For example, if the control light L13 is the right circularly polarized light, only the up spins in the linearly polarized light L10 are excited, and thus the transmission rate and refractive index of the optically non-linear element are varied with respect to only the right circularly polarized light component L12. Hence, as shown in FIG. 10B, the right circularly polarized light L12 in the light L10 is increased by only α in the x-axis and y-axis directions. Hence, the difference α between the light components L11 and L12 appears in the y-axis direction.

The totally optical system can be realized by optically extracting the above difference component α in the y-axis direction. According to the second embodiment of the present invention, the difference component α is optically extracted by causing the linearly polarized light L10 (that is, the components L11 and L12 shown in FIG. 10B) to pass through a polarizer located in the y-axis direction orthogonal to the x-axis direction in which the electric field components coincide with each other. Alternatively, it is also possible to optically extract the difference component α by means of a polarization beam splitter. The signal light which enters into and outgoes from the polarization beam splitter is a P-polarized light. When the light reflected by the optically non-polarized element is made to pass through the polarization beam splitter again, the light outgoing from the beam splitter is an S-polarized light in the orthogonal direction. This S-polarized light component corresponds to the component in the y-axis direction.

Figure 10B:
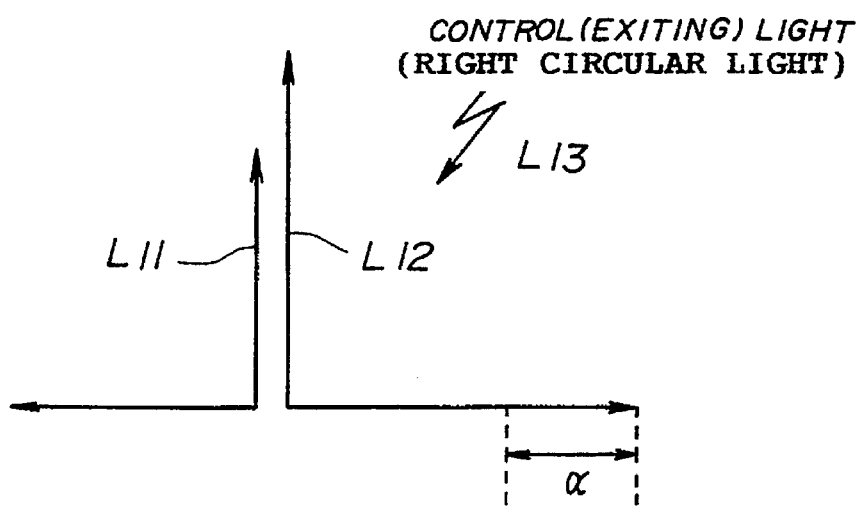
Figure 10C:
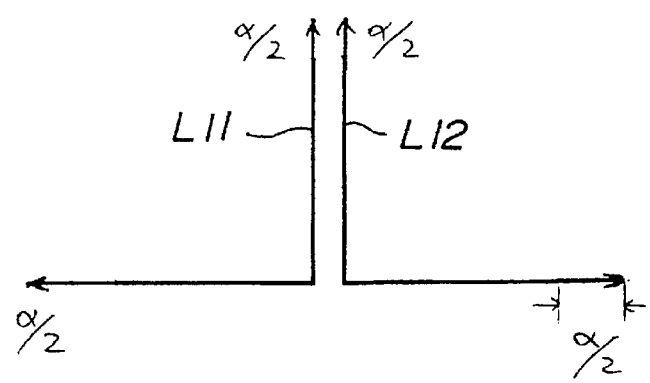

The light L10 returns to the state shown in FIG. 10C from the state shown in FIG. 10B due to spin relaxation for a few picoseconds to tens of picoseconds.

The above principle of the second embodiment of the present invention will further be described using the matrix expression.

An arrangement in which the linearly polarized light is incident to a quarter wave plate at an inclined angle of 45° can be expressed with an operator as follows:

$$c\left(\frac{\pi}{2}\right) = \frac{1}{\sqrt{2}} \begin{pmatrix} 1 & -i \\ -i & 1 \end{pmatrix}$$

An arrangement using a minus quarter wave plate can be expressed as follows:

$$c\left(-\frac{\pi}{2}\right) = \frac{1}{\sqrt{2}} \begin{pmatrix} 1 & i \\ i & 1 \end{pmatrix}$$

The up spin $\sigma_+$ and the down spin $\sigma_-$ are respectively written as follows:

$$\sigma_+ = \frac{1}{2} \begin{pmatrix} 1 & -i \\ i & 1 \end{pmatrix}$$

$$\sigma_- = \frac{1}{2} \begin{pmatrix} 1 & i \\ -i & 1 \end{pmatrix}$$

Due to projection of the control light of the right circular polarization, the transmission rate and the reflection rate of the optically polarized element are varied with respect to only the right circularly polarized light component in the signal light. Hence, the operator relating to the control light can be written as follows:

$$(1+\Delta)\sigma_+ + \sigma_- = I + \Delta\sigma_+.$$

The linearly polarized signal light having an x component Ex becomes has the following component after passing through the quarter wave plate:

$$c\left(\frac{\pi}{2}\right)(I+\Delta\sigma_+)\begin{pmatrix} E_x \\ 0 \end{pmatrix} = \frac{1}{\sqrt{2}} \begin{pmatrix} 1+\Delta \\ -i \end{pmatrix} E_x$$

The difference between the x component and y component of the light outgoing from the quarter wave plate is expressed as follows:

$$\tfrac{1}{2}[1+2\Delta+\Delta^2-1]E_x^2 = \tfrac{1}{2}[2\Delta+\Delta^2]E_x^2$$

The operator after the spin relaxation can be considered as:

$$I+\tfrac{1}{2}\Delta\sigma_+ + \tfrac{1}{2}\Delta\sigma_- = [1+\tfrac{1}{2}]I$$

Thus, the following can be obtained:

$$c\left(\frac{\pi}{2}\right)\left(1+\frac{\Delta}{2}\right)I\begin{pmatrix} E_x \\ 0 \end{pmatrix} = \frac{1+\Delta/2}{2\sqrt{2}} \begin{pmatrix} 1 \\ -i \end{pmatrix} E_x$$

Hence, the difference between the x component and Y component is as follows:

$$I_s = \left(\frac{1+\Delta/2}{\sqrt{2}}\right)^2 (1-1)E_x^2 = 0$$

As a result, it becomes possible to optically output the difference between the lights by providing, after the above quarter wave plate, an optical device capable of optically extracting the above difference.

Now, parameters a, b, c and d are used to define such an optical device. The signal light after passing through the quarter wave plate and the optical device in this sequence can be written as follows:

$$\begin{pmatrix} a & b \\ c & d \end{pmatrix} \frac{1}{\sqrt{2}} \begin{pmatrix} 1+\Delta \\ -i \end{pmatrix} E_x = \frac{1}{\sqrt{2}} \begin{pmatrix} a(1+\Delta)-bi \\ c(1+\Delta)-di \end{pmatrix} E_x$$

The optical subtracting operation can be realized by a matrix which satisfies one of the following:

(a b)=(1 −i), (i 1)

(c d)=(1 −i), (i 1).

This can be achieved by the following:

$$c\left(\frac{\pi}{2}\right) = \frac{1}{\sqrt{2}} \begin{pmatrix} 1 & -i \\ -i & 1 \end{pmatrix}$$

$$c\left(-\frac{\pi}{2}\right) = \frac{1}{\sqrt{2}} \begin{pmatrix} 1 & i \\ i & 1 \end{pmatrix}$$

Hence, it can be seen from the following that it is necessary to omit the quarter wave plate provided in the path of the signal light or cause the signal light to pass through the quarter wave plate again:

$$[c(\pi/2)]^{-1} = c[-\pi/2]$$

When the above quarter wave plate is omitted, the signal light before the control light is applied has the following components:

$$\begin{pmatrix} E_x \\ 0 \end{pmatrix}$$

When the control light is applied to the quarter wave plate, the signal light can be changed to:

$$(I + \Delta \sigma_+) \begin{pmatrix} E_x \\ 0 \end{pmatrix} = \frac{1}{2} \begin{pmatrix} 2 + \Delta \\ \Delta i \end{pmatrix} E_x$$

After the control light is applied to the quarter wave plate, the signal light can be written as follows:

$$\left(1 + \frac{\Delta}{2}\right) I \begin{pmatrix} E_x \\ 0 \end{pmatrix} = \left(1 + \frac{1}{2} \Delta \right) \begin{pmatrix} E_x \\ 0 \end{pmatrix}$$

Thus, only the light component in the y-axis direction can be extracted by means of a polarizer (see FIGS. 10A–10C). Though the finally extracted light does not have a great intensity, the difference between the light components can be optically extracted without any electric signals. If it is desired that the sum of the light components be extracted instead of the subtraction, only the light components in the x-axis direction are extracted.

When variations in the refractive index of the optically non-linear element are utilized, a phase difference between the right and left circularly polarized light components will take place. Thus, the polarization of the signal light may be advantageously inclined slightly. This result enhances the signal intensity.

In the above-mentioned way, the difference between the light components can be optically output, so that high speed light switching can be realized.

The above description with reference to the matrix notation holds true for not only the light absorption but also refraction.

Figure 11:
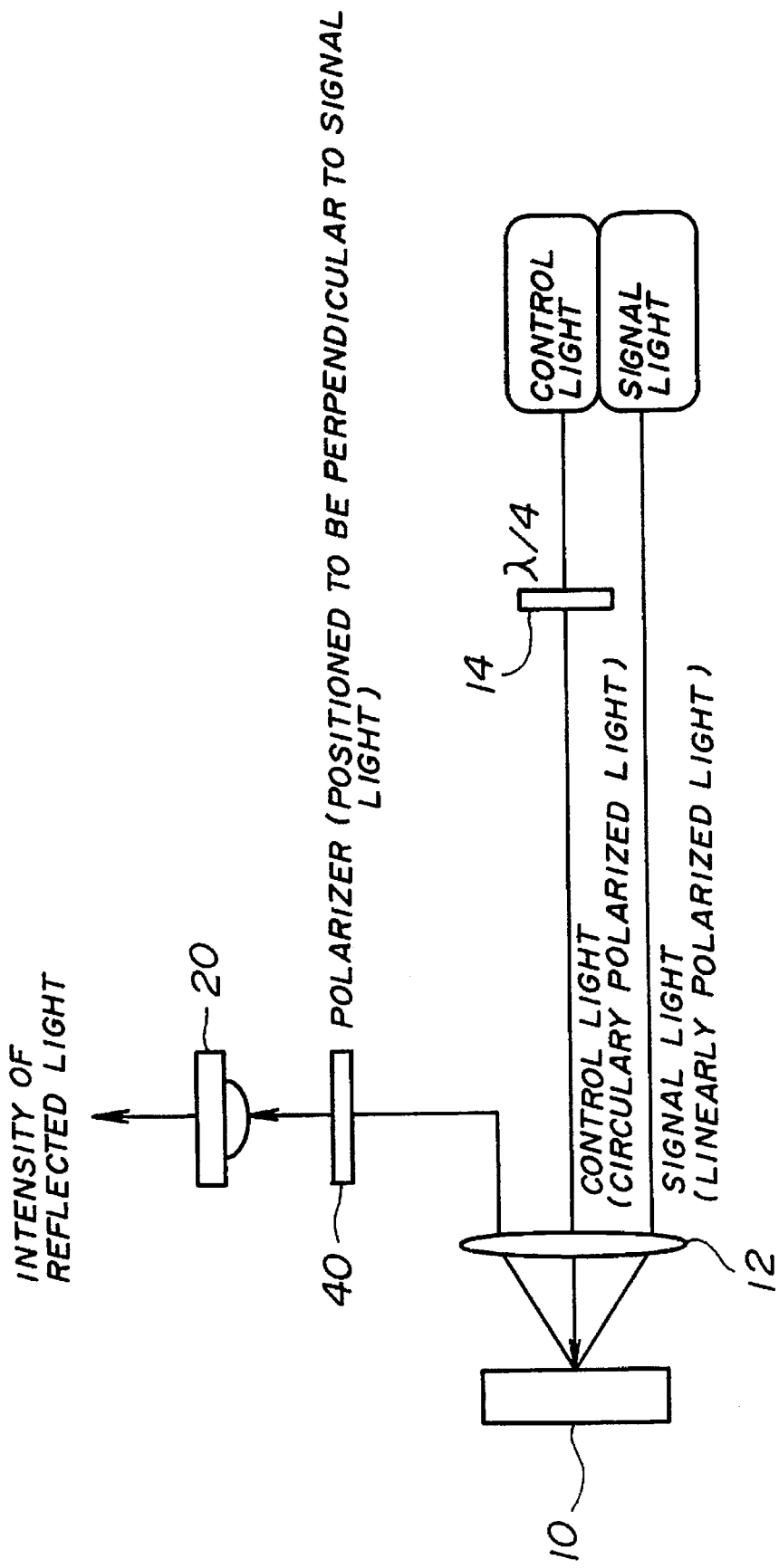
FIG. 11 is a diagram of a light switching apparatus according to the second embodiment of the present invention.

FIG. 11 shows a first version of a light switching system according to the second embodiment of the present invention. In FIG. 11, parts that are the same as those shown in the previously described figures are given the same reference numbers.

As compared with the structure shown in FIG. 2, the structure shown in FIG. 11 is not equipped with the quarter wave plate 16, the polarization beam splitter 18 and one of the two photodetectors 20 shown in FIG. 2. Instead, the structure shown in FIG. 11 is equipped with a polarizer 40 located in the optical path between the lens 12 and the single photodetector 20.

More particularly, the signal light is reflected by the optically non-linear etalon 10 and passes through the polarizer 40. The polarizer 40 is located in the y-axis direction shown in FIG. 10A, and outputs a variation in the light signal component in the y-axis direction as shown in FIG. 10B. That is, the polarizer 40 outputs the difference between the y-axis direction component of the right circularly polarized light and the y-axis; direction component of the left circularly polarized light. As will be seen from the aforementioned analysis, the quarter wave plate 16 is not needed in the second embodiment of the present invention. The photodetector 20, which is not an essential element in the fully optical system, is used to electrically observe the light outgoing from the polarizer 40.

Figure 12:
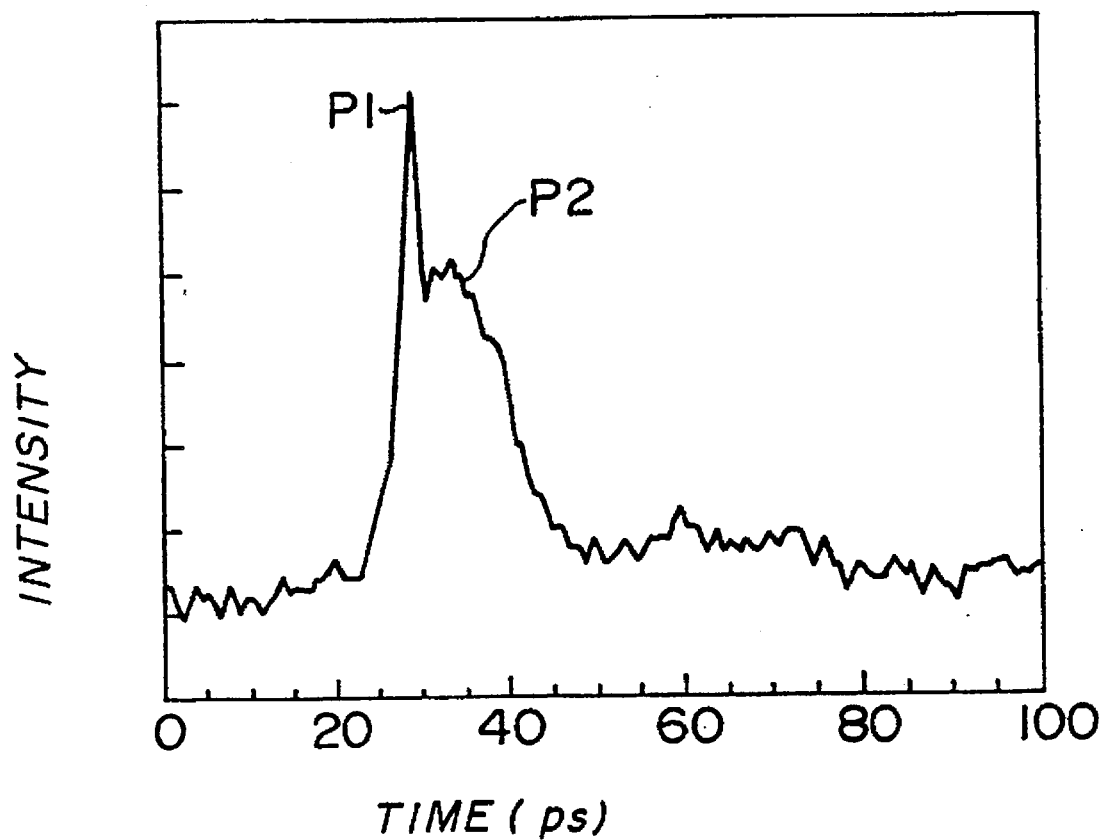
FIG. 12 is a graph of an output signal of the light switching apparatus according to the second embodiment of the present invention.

FIG. 12 is a graph of the output signal of the photodetector 20. Before the control light (exciting light) is applied, the state shown in FIG. 10A is available, and the polarizer 40 does not any output. In practice, the polarizer 40 may output a small signal due to noise even in the state shown in FIG. 10A.

When the control light is applied to the optically non-linear etalon 10, the level of the output signal of the photodetector 40 is increased in a moment. A peak P1 shown in FIG. 12 is a coherent spike, which appears in a moment when the control light having the same polarization as the signal light is applied. Thereafter, a peak P2 corresponding to the difference $\alpha^2$ shown in FIG. 10B. Then, due to spin relaxation, the optically non-linear etalon 10 returns to the state shown in FIG. 10C, so that no output is obtained from the polarizer 40 except for noise. The time it takes to return to the state shown in FIG. 10C after the rising of the peak P1 is approximately 30 picoseconds. It can be seen from the above fact that the output light of the polarizer 40 is switched at an extremely high speed.

Figure 13:
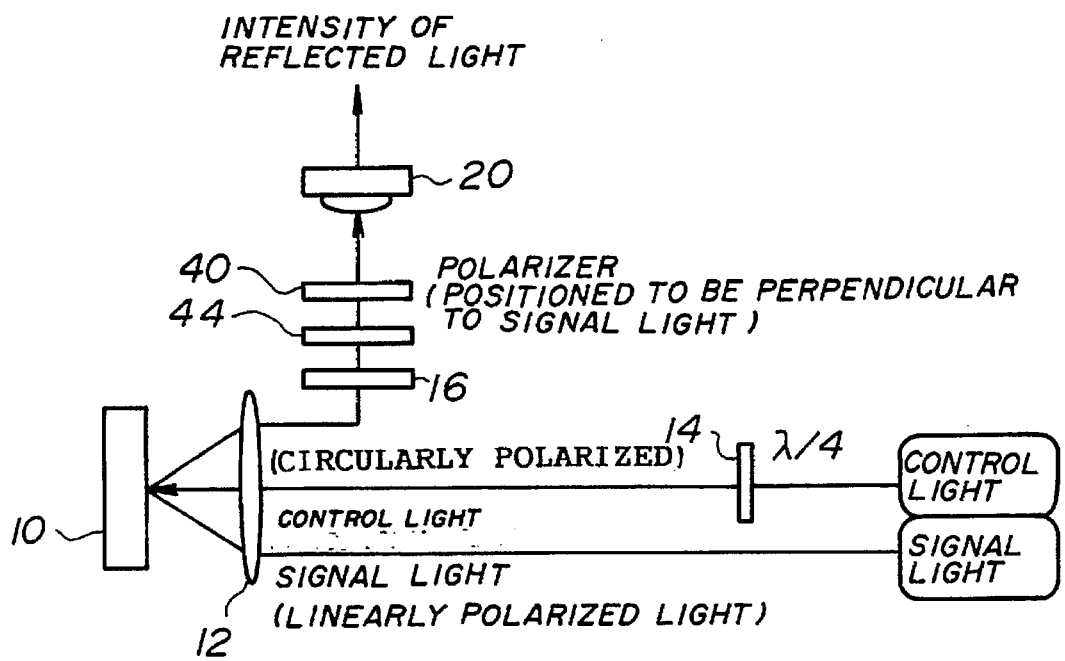
FIG. 13 is a diagram of a first variation of the structure shown in FIG. 11.

FIG. 13 shows a first variation of the second embodiment of the present invention. In FIG. 13, parts that are the same as those shown in the previously described figures are given the same reference numbers. As will be seen from the aforementioned principle of the second embodiment of the present invention, it is possible to make the signal sight operatively pass through the quarter wave plate twice (more generally, an even number of times). The structure shown in FIG. 13 is configured with the above in mind. In addition to the quarter wave plate 16 used in the first embodiment of the present invention, another quarter wave plate 44 is provided before the polarizer 40. This variation thus configured has the same function and effect as the those of the second embodiment of the present invention shown in FIG. 11.

Figure 14:
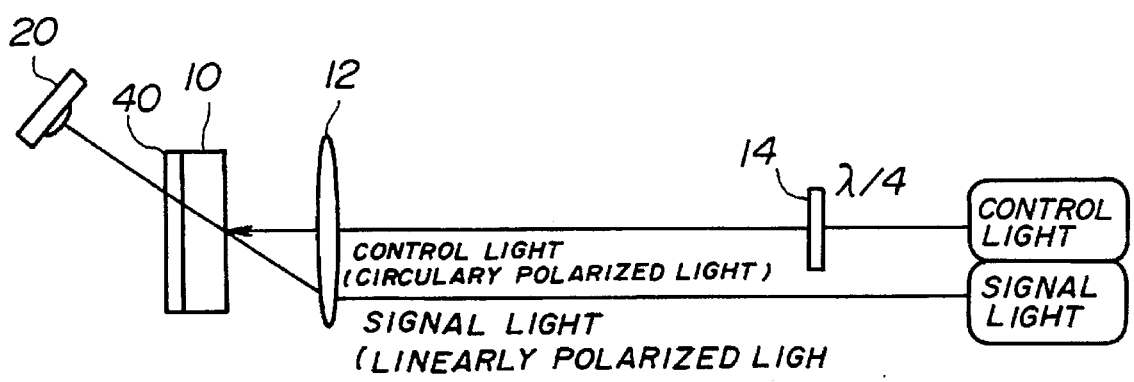
FIG. 14 is a diagram of a second variation of the structure shown in FIG. 11.

FIG. 14 shows a second variation of the structure shown in FIG. 11. In FIG. 14, parts that are the same as those shown in the previously described figures are given the same reference numbers. The polarizer 40 receives the signal light passing through the optically non-linear etalon 10. The polarizer 40 may be attached to the optically non-linear etalon 10 or may be spaced apart therefrom, as shown in FIG. 14. As has been described previously, the GaAs substrate of the etalon 10 is not needed when it allows the signal light to pass therethrough. Alternatively, it is also possible to form a pattern functioning as the polarizer 40 on the back surface of the optically non-linear etalon 10.

Figure 15:
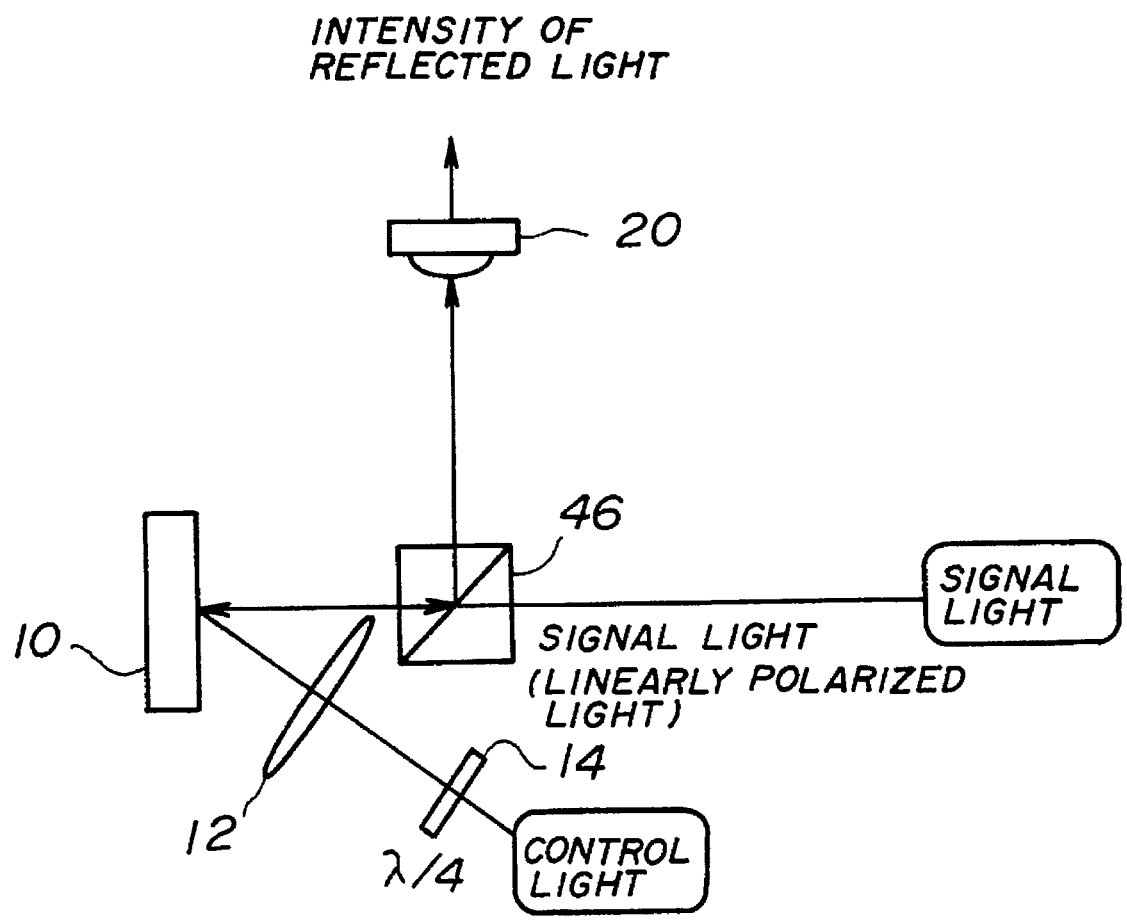
FIG. 15 is a diagram of a third variation of the structure shown in FIG. 11.

FIG. 15 shows a third variation of the structure shown in FIG. 11. In FIG. 15, parts that are the same as those shown in the previously described figures are given the same reference numbers. The structure shown in FIG. 15 is equipped with a polarization beam splitter 46 instead of the polarizer 40. The beam splitter 46 results in the y-axis direction light components shown in FIG. 10A. The polarization beam splitter 46 allows the P-polarized light to pass therethrough without any modification, and outputs the S-polarized light at the right angle. The signal light of the P-polarized light (linearly polarized light), which corresponds to the x-axis direction components shown in FIG. 10A, passes through the beam splitter 46 straight, and is applied to the optically non-linear etalon 10. The control light of the linear polarization is changed to the right circularly polarized control light through the quarter wave plate 12, and is then obliquely applied to the optically non-linear etalon 10. The polarization beam splitter 46 is positioned so that the signal light and its reflected version go along the same optical axis. Only the S-polarized components (which correspond to the y-axis direction components shown in FIG. 10A) outgo from the beam splitter 46 at the right angle. When the S-polarized light components are detected by the photodetector 20, the same switching performance as shown in FIG. 12 can be obtained.

FIG. 16 shows a variation of the structure shown in FIG. 15. In FIG. 16, parts that are the same as those shown in the previously described figures are given the same reference numbers. The control light (exciting light) is applied to the back surface of the optically non-linear etalon 10. The function and effect of the structure shown in FIG. 16 are the same as those of the structure shown in FIG. 15. The structure shown in FIG. 16 has a particular advantage in which the optical axis of the polarization beam splitter 46 can be easily aligned to the oblique light application. The oblique application of the control light is intended to prevent the photodetector 20 from detecting the control light.

The present invention is not limited to the specifically disclosed embodiments and variations thereof, and variations and modifications may be made without departing from the scope of the present invention.

What is claimed is:

1. A light switching method comprising the steps of:

applying a signal light of a linear polarization to an optically non-linear etalon; and applying a control light of a circular polarization or elliptical polarization to the optically non-linear etalon, the control light varying a refractive index of the optically non-linear etalon to thereby perform a switching operation on an intensity of the signal light.

2. The light switching method as claimed in claim 1, further comprising a step of performing the switching operation on the signal light which passes through the optically non-linear etalon.

3. The light switching method as claimed in claim 1, further comprising a step of performing the switching operation on the signal light which is reflected by the optically non-linear etalon.

4. The light switching method as claimed in claim 1, further comprising a step of extracting linearly polarized light components of the signal light after the signal light passes through or is reflected by the optically non-linear etalon, said linearly polarized light components being perpendicular to the signal light before the signal light is applied to the optically non-linear etalon.

5. The light switching method as claimed in claim 1, further comprising a step of, after the signal light passes through or is reflected by the optically non-linear etalon, making the signal light pass through a polarizer position in a direction perpendicular to the signal light before the signal light is applied to the optically non-linear etalon.

6. The light switching method as claimed in claim 5, further comprising a step of, before the signal light passes through the polarizer, making the signal light pass through two quarter wave plates.

7. The light switching method as claimed in claim 4, wherein the extracting step comprises a step of applying the signal light after the signal light is made to pass through a polarization beam splitter and applying a reflected light of the signal light to a polarizer along the same optical path as the signal light travels towards the polarization beam splitter.

8. The light switching method as claimed in claim 1, wherein the light signal is applied to the optically non-linear etalon having the optically non-linear substance which is sandwiched between mirrors.

9. A light switching apparatus comprising:

an optically non-linear etalon;

first optical means for applying a signal light of a linear polarization to the optically non-linear etalon; and second optical means for applying a control light of a circular polarization or elliptical polarization to the optically non-linear etalon, the control light varying a refractive index of an optically non-linear substance of the optically non-linear etalon to thereby perform a switching operation on the signal light.

10. The light switching apparatus as claimed in claim 9, further comprising:

converting means for converting the signal light reflected by the optically non-linear etalon or passing through the optically non-linear etalon into a linearly polarized light;

separating means for separating a longitudinally polarized light and a transversely polarized light of said linearly polarized light from each other; and detecting means for detecting a difference between the longitudinally polarized light and the transversely polarized light.

11. The light switching apparatus as claimed in claim 9, wherein said optically non-linear substance comprises GaAs.

12. The light switching apparatus as claimed in claim 9, wherein said optically non-linear substance comprises a multiple quantum well having a stacked structure in which two different layers with different band gaps are alternately stacked.

13. The light switching apparatus as claimed in claim 12, wherein said two different layers with the different band gaps respectively comprise GaAs and AlGaAs.

14. The light switching apparatus as claimed in claim 9, wherein said optically non-linear substance comprises a plurality of unit structures, each including:

barrier layers having a thickness which allows carriers to pass therethrough by tunneling;

a first quantum well layer functioning as a quantum well with respect to a direct transition; and a second quantum well layer functioning as a quantum well with respect to an indirect transition and having a quantum level of electrons related to the indirect transition being lower than that of electrons related to the direct transition, the barrier layers being sandwiched by the first and second quantum wells.

15. The light switching apparatus as claimed in claim 14, wherein:

said barrier layers comprise AlGaAs layers;

said first quantum well layer comprises a GaAs layer; and said second quantum well layer comprises an AlAs layer.

16. The light switching apparatus as claimed in claim 9, wherein:

said optically non-linear substance comprises a plurality of first and second quantum wells alternately stacked;

the first quantum well layer functions as a quantum well with respect to a direct transition; and the second quantum well layer functions as a quantum well with respect to an indirect transition and having a quantum level of electrons related to the indirect transition being lower than that of electrons related to the direct transition.

17. The light switching apparatus as claimed in claim 16, wherein:

said first quantum well layer comprises a GaAs layer; and said second quantum well layer comprises an AlAs layer.

18. The light switching apparatus as claimed in claim 9, further comprising means for extracting linearly polarized light components of the signal light after the signal light passes through or is reflected by the optically non-linear etalon, said linearly polarized light components being perpendicular to the signal light before the signal light is applied to the optically non-linear etalon.

19. The light switching apparatus as claimed in claim 9, further comprising means for, after the signal light passes through or is reflected by the optically non-linear etalon, making the signal light pass through a polarizer position in a direction perpendicular to the signal light before the signal light is applied to the optically non-linear etalon.

20. The light switching apparatus as claimed in claim 19, further comprising means, before the signal light passes through the polarizer, making the signal light pass through two quarter wave plates.

21. The light switching apparatus as claimed in claim 18, wherein said extracting means comprises means for applying the signal light after the signal light is made to pass through a polarization beam splitter and applying a reflected light of the signal light to a polarizer along the same optical path as the signal light travels towards the polarization beam splitter.

22. The light switching apparatus as claimed in claim 9, wherein the optically non-linear etalon has the optically non-linear substance which is sandwiched between mirrors.

23. The light switching apparatus as claimed in claim 19, wherein said polarizer is attached to said optically non-linear substance.

24. An optical semiconductor device comprising:
a first mirror provided on a first surface of said optically non-linear substance; and
a second mirror provided on a second surface of said optically non-linear substance,
a signal light of a linear polarization being applied to said optically non-linear etalon,
a control light of a circular polarization or elliptical polarization being applied to said optically non-linear etalon, and
the control light varying a refractive index of said optically non-linear substance to thereby perform a switching operation on the signal light.

25. The optical semiconductor device as claimed in claim 24, wherein said optically non-linear substance comprises:
barrier layers having a thickness which allows carriers to pass therethrough by tunneling;
a first quantum well layer functioning as a quantum well with respect to a direct transition; and
a second quantum well layer functioning as a quantum well with respect to an indirect transition and having a quantum level of electrons related to the indirect transition being lower than that of electrons related to the direct transition,
the barrier layers being sandwiched by the first and second quantum wells.

26. The optical semiconductor device as claimed in claim 25, wherein:
said barrier layers comprise AlGaAs layers;
said first quantum well layer comprises a GaAs layer; and
said second quantum well layer comprises an AlAs layer.

27. The optical semiconductor device as claimed in claim 25, wherein:
said optically non-linear substance comprises a plurality of first and second quantum wells alternately stacked;
the first quantum well layer functions as a quantum well with respect to a direct transition; and
the second quantum well layer functions as a quantum well with respect to an indirect transition and having a quantum level of electrons related to the indirect transition being lower than that of electrons related to the direct transition.

28. The optical semiconductor device as claimed in claim 27, wherein:
said first quantum well layer comprises a GaAs layer; and
said second quantum well layer comprises an AlAs layer.

29. The optical semiconductor device as claimed in claim 24, wherein:
said first mirror comprises AlAs layers and AlGaAs layers alternately stacked; and
said second mirror comprises AlAs layers and AlGaAs layers alternately stacked.

* * * * *